United States Patent Office 3,545,308
Patented Dec. 8, 1970

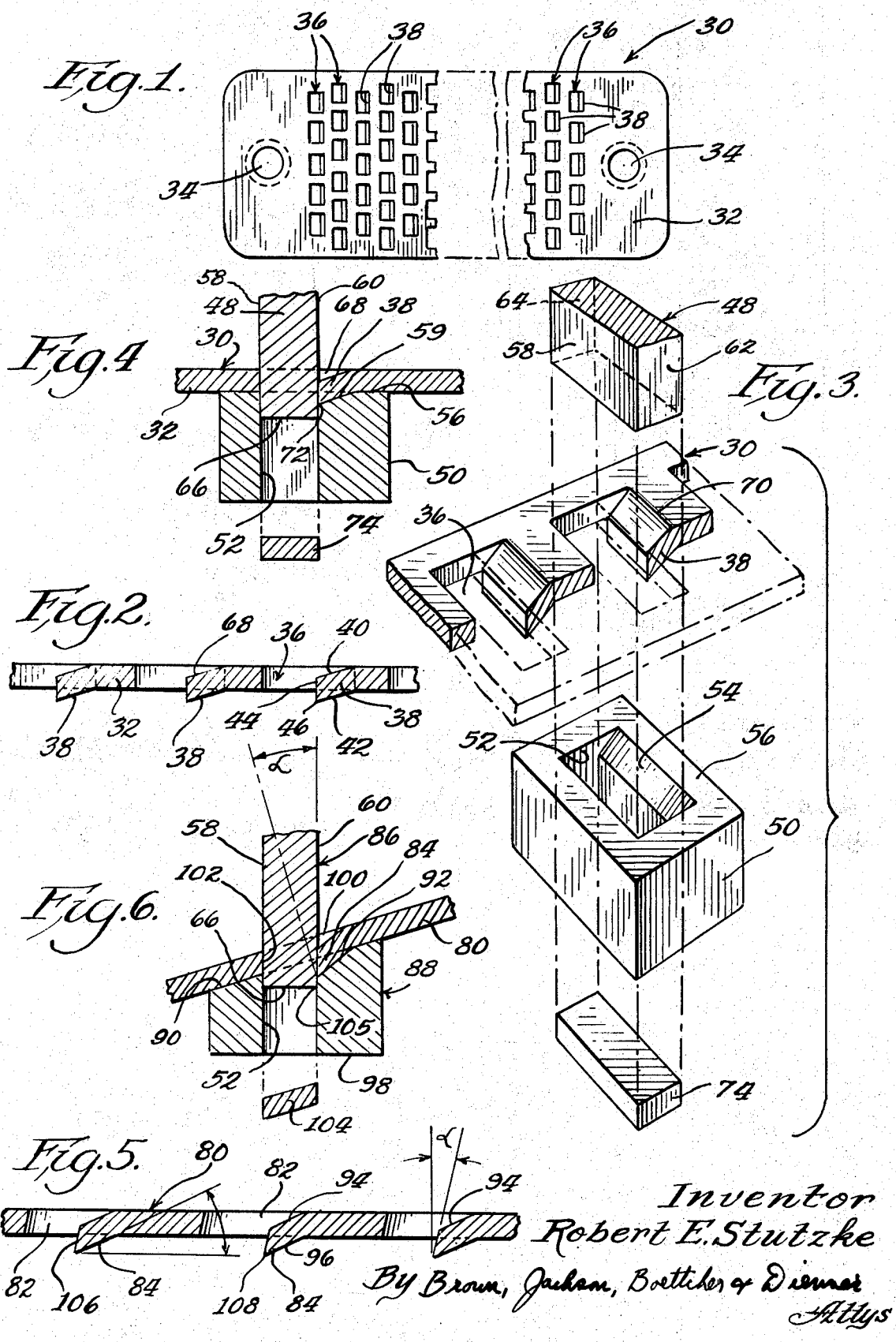

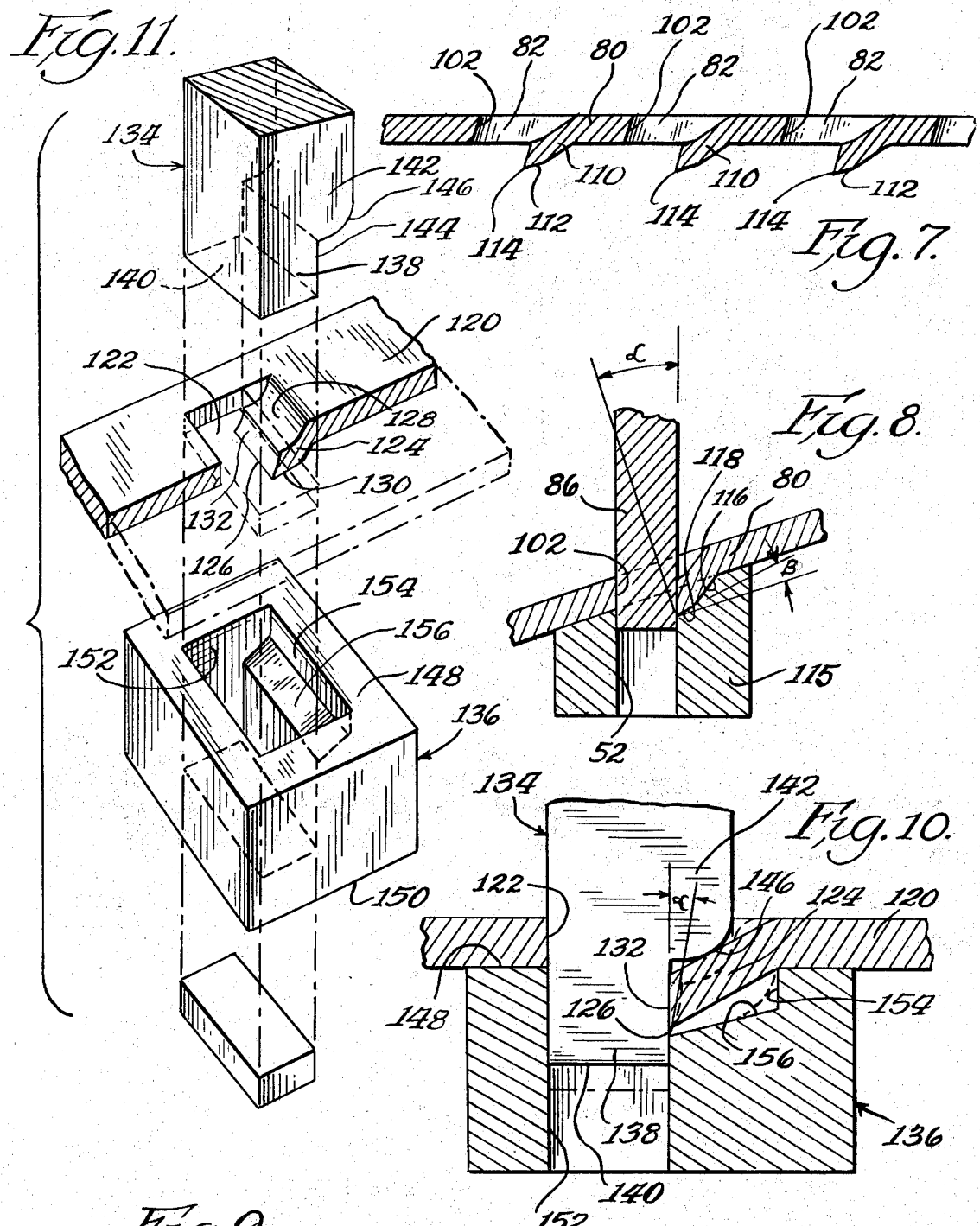

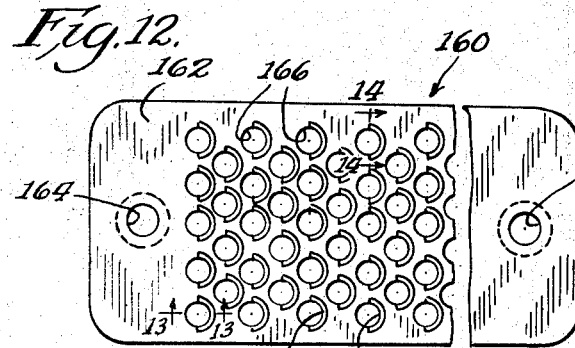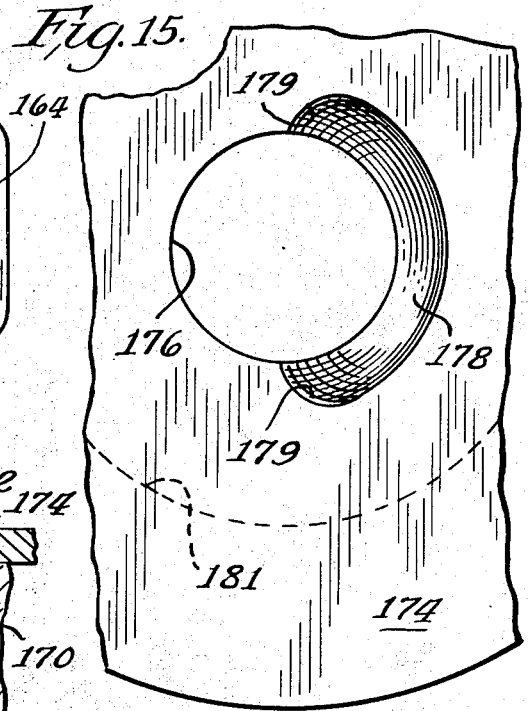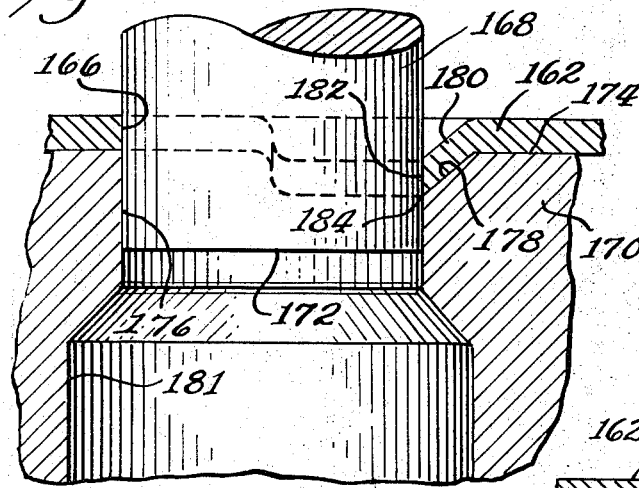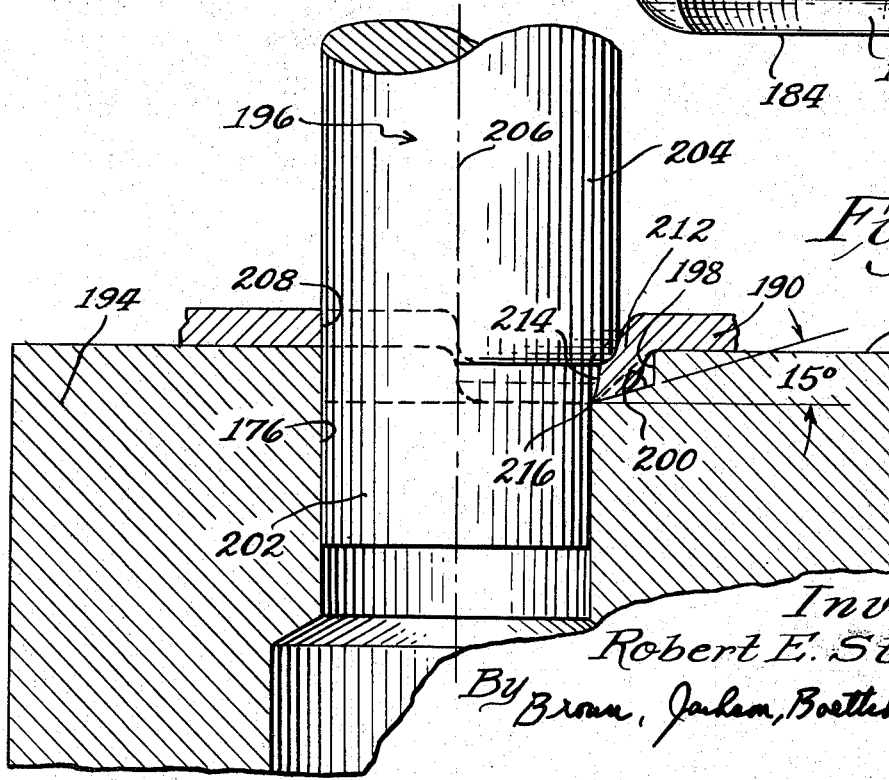

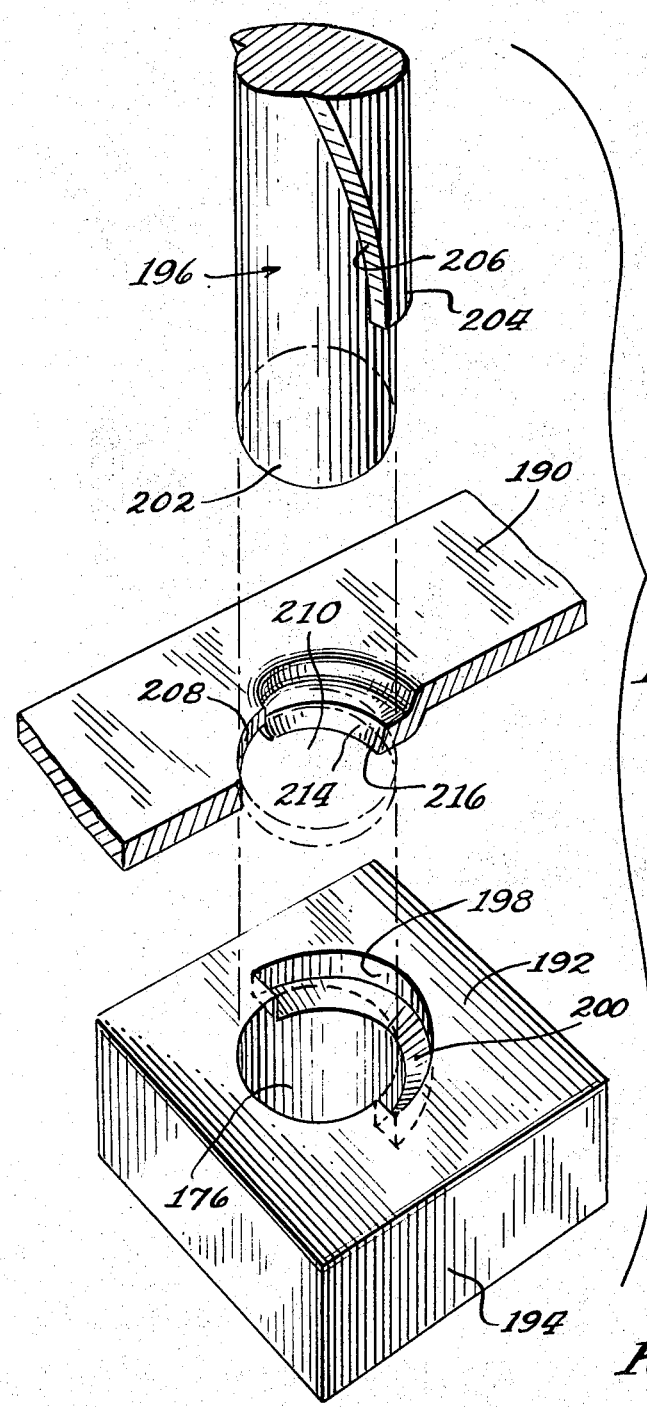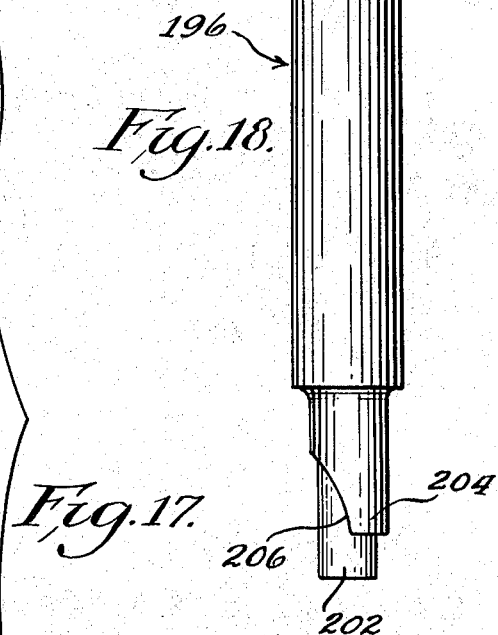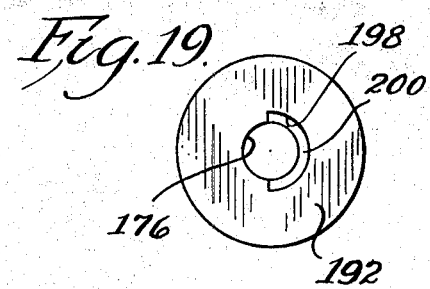

3,545,308
TOOL DEVICE AND METHOD AND APPARATUS FOR MAKING THE SAME
Robert E. Stutzke, Louisville, Ky., assignor to Vermont American Corporation, Louisville, Ky., a corporation of Kentucky
Filed Oct. 4, 1967, Ser. No. 672,860
Int. Cl. B23d 73/04, 71/00; B21k 21/00
U.S. Cl. 76—24
8 Claims

ABSTRACT OF THE DISCLOSURE

A tool for use in reducing work pieces and the like comprising a generally planar body member having a plurality of apertures formed therein by punch and die means, a cutting tooth struck from the body member by the punch and die means adjacent each of the apertures and having a cutting edge formed on the depending end portion thereof, each cutting tooth being defined by parallel upper and lower surfaces and having rake and clearance angles selectively formed thereon, the apertures, depending cutting teeth, cutting edges, rake and clearance angles being formed by a single continuous cooperative engagement of the punch and die means.

BACKGROUND OF THE INVENTION

Metal working tools such as are commonly termed sheet metal files have come into fairly widespread use in recent years for removing material from work pieces made of wood and soft metals in similar fashion to a conventional plane or wood rasp. The sheet metal files are generally made from flat sheet metal bodies which may be mounted in a frame for convenient maneuverability.

While the sheet metal files heretofore available have proven to be fairly effective in removing material from work pieces made of wood and soft metals, they are not satisfactory for use with plastic materials such as automotive body filler plastic. The known sheet metal files tend to abrade the plastic material and tear it from its base support material. Moreover, the known sheet metal files are produced by methods which generally employ a plurality of separate steps including shearing and upsetting of tooth portions by a stamping operation, bending the tooth portions from the plane of the sheet metal body, grinding a cutting edge on the lower end of each tooth, and then working each tooth to form the desired clearance and rake angles adjacent the cutting edge. These prior art methods of manufacture have created high production costs and thereby resulted in higher costs to the consumer.

SUMMARY OF THE INVENTION

It is one of the primary objects of the present invention to provide a sheet metal file which is particularly suitable for use with plastic materials while in their plastic state and after setting.

Another object of the present invention is to provide a work piece reducing tool including a generally planar sheet metal body having a plurality of apertures therein, portions of the apertures being defined by depending cutting teeth having cutting edges on the lower ends thereof, and which cutting edges and depending teeth are formed substantially simultaneously with the forming of the corresponding apertures.

Another object of the present invention is to provide a work piece reducing tool as above described wherein each of the cutting teeth includes upper and lower surface portions with the upper surface portions being disposed in parallel relation to the bottom surface portions to thereby substantially strengthen each of the cutting teeth.

Another object of the present invention is to provide a work piece reducing tool as described having relatively small positive rake and clearance angles, the exact magnitude of which angles may be selected to obtain optimum material removal action on the work pieces.

Another object of the present invention is to provide a work piece reducing tool as described wherein each depending cutting tooth has primary and secondary clearance angles formed thereon, with the secondary clearance angle permitting the cutting tooth to project a substantial distance from the plane of the body and the primary clearance angle providing a small clearance angle adjacent the cutting edge of the tooth.

A further object of the present invention is to provide a method of making a sheet metal file having a planar sheet metal body, a plurality of apertures in the body, and cutting teeth depending from the body adjacent the apertures, which method comprises striking the cutting teeth from the planar body simultaneously with forming the apertures therein by punch and die means, with continued movement of the punch into the die forming cutting edges on the teeth.

Another object of the present invention is to provide a method of producing sheet metal files as described including the step of forming each cutting tooth at an intermediate portion during the single continuous punch movement such that the lower frontal face portion of each tooth is provided with a positive rake angle.

Another object of the present invention is to provide a method of producing sheet metal files as described further including the step of forming primary and secondary clearance angles on the lower surface of each cutting tooth through the single continuous stroke of the punch into cooperating relation with the die.

Still another object of the present invention is to provide a novel punch and die arrangement for use in producing sheet metal files, which punch and die are operable to form downwardly inclined cutting teeth from a sheet metal body, with the depending teeth having cutting edges and rake and clearance angles formed on the lower ends thereof during a continuous single stroke of the punch into cooperating relation with the die member.

Another object of the present invention is to provide a punch and die set for use in producing sheet metal files wherein the punch and die members are provided with cooperating portions which serve to form rake and clearance angles on each depending cutting tooth by working an intermediate portion of each tooth struck from the sheet metal body through a continuous stroke of the punch member in cooperating relation with the die member.

In one embodiment of a sheet metal file in accordance with the present invention, a generally planar sheet metal body has a plurality of apertures formed therein by punch and die means. A peripheral portion of each aperture is defined by a depending cutting tooth struck from the sheet metal body by a punch. The lower ends of the cutting teeth have cutting edges thereon formed during downward movement of the punch into cooperating relation with the die. The upper support surface of the die may be inclined relative to the axes of die cavities which receive the punch such that when a cutting edge is formed on the lower end of each tooth by the punch, a small positive rake angle will be established. Each cavity in the die member has an inclined surface against which the corresponding cutting tooth is formed to establish a clearance angle on the tooth while maintaining the upper and lower surfaces of each tooth in parallel relation.

Another embodiment of the present invention utilizes a die member wherein the punch receiving cavities include recess or pocket portions defined by inclined surfaces such that primary and secondary clearance angles are established on cutting teeth formed from the flat sheet metal body by the punch. The punch has enlarged shoulder portions formed thereon which engage the cutting teeth struck from the body and form intermediate portions thereof against the inclined recess portions to the die to give each tooth the desired rake and clearance angles.

Further objects and advantages of my invention, together with the organization and manner of operation thereof, may best be understood by reference to the following description of preferred embodiments of the invention when taken in conjunction with the accompanying drawings, in which like reference numerals designate like parts throughout the several views.

BRIEF DESCRIPTION OF THE DRAWINGS

FIG. 1 is a plan view of a sheet metal file in accordance with the present invention wherein the apertures are generally rectangular in plan configuration;

FIG. 2 is a partial, enlarged vertical sectional view, taken substantially along the line 2—2 of FIG. 1, illustrating the depending cutting teeth profiles and cutting edges of the sheet metal file of FIG. 1;

FIG. 3 is a perspective view of a punch and die arrangement used to produce a single cutting tooth of the type illustrated in FIG. 2, the punch and die being shown in spaced relation with a portion of the formed sheet metal body positioned therebetween;

FIG. 4 is a vertical sectional view illustrating the punch and die members of FIG. 3 in operative relation with a section of the sheet metal body after having formed a cutting tooth therefrom;

FIG. 5 is a partial vertical sectional view similar to FIG. 2 but illustrating an alternative cutting tooth profile;

FIG. 6 is a vertical sectional view generally similar to FIG. 4 but illustrating a punch and die arrangement for forming the cutting tooth profile shown in FIG. 5;

FIG. 7 is a partial vertical sectional view similar to FIG. 5 but illustrating yet another cutting tooth profile according to the present invention;

FIG. 8 is a vertical sectional view generally similar to FIG. 6 but illustrating a punch and die arrangement for forming the cutting tooth profile of FIG. 7;

FIG. 9 is a partial vertical sectional view, generally similar to FIG. 7, illustrating still another cutting tooth profile according to the present invention;

FIG. 10 is a vertical sectional view generally similar to FIG. 4 but illustrating a punch and die arrangement for forming the cutting tooth profile of FIG. 9, the punch and cutting tooth being shown in solid lines as the tooth is initially bent downwardly, and in dash lines as the tooth is formed against the inclined surface of the die recess to establish a small positive rake angle;

FIG. 11 is a perspective view, generally similar to FIG. 3 illustrating the punch and die of FIG. 10 in exploded relation with a formed section of the sheet metal body being disposed therebetween;

FIG. 12 is a plan view, generally similar to FIG. 1, showing an alternative embodiment of a sheet metal file having generally circular apertures formed therein;

FIG. 13 is a partial, enlarged vertical sectional view of a punch and die arrangement for establishing a tooth profile as viewed in the direction of the arrows 13—13 in FIG. 12;

FIG. 14 is a partial vertical sectional view of a cutting tooth produced in accordance with the punch and die of FIG. 13, looking in the direction of arrows 14—14 of FIG. 12;

FIG. 15 is a top plan view of the die member illustrated in FIG. 13;

FIG. 16 is a partial vertical sectional view illustrating a punch and die arrangement in operative relation with a portion of a sheet metal body to form an alternative cutting tooth profile adjacent a circular aperture;

FIG. 17 is a perspective view of the punch and die arrangement illustrated in FIG. 16, showing a projecting shoulder portion on the punch to establish the desired tooth profile in cooperation with the die;

FIG. 18 is a side detail view on smaller scale of the punch illustrated in FIGS. 16 and 17; and FIG. 19 is a plan view of the upper surface of the die illustrated in FIGS. 16 and 17.

DESCRIPTION OF PREFERRED EMBODIMENTS

Referring now to the drawings, and in particular to FIG. 1, one preferred embodiment of a sheet metal file in accordance with the present invention is illustrated in plan view. The sheet metal file, indicated generally at reference numeral 30, has a generally planar metallic body member 32 made from a flat strip of sheet metal such as a suitable piece of strip steel. The body member 32 may have any desired plan configuration, such as a generally rectangular shape, the plan configuration being primarily determined by the desired application or usage of the file.

The body member 32 is preferably provided with means which allow it to be secured to a suitable support for ready manipulation of the file. For example, such means could be a pair of apertures 34 (FIG. 1) generally adjacent opposite end portions of the body to allow mounting screws to be inserted therethrough. As will become more apparent hereinbelow, the thickness of the sheet metal body 32 is selected to provide adequate support or backing for cutting teeth formed from the body member. It is desirable that the thickness of the metallic body 32 be substantially equal to the desired thickness of the cutting teeth such that upon forming the teeth, the desired thickness thereof exists without further working of the teeth.

Referring now to FIG. 1, taken in conjunction with FIGS. 2–4, a plurality of generally rectangular apertures or openings, indicated generally at reference numeral 36, are formed in the body member 32 in a selected arrangement. Preferably, the apertures are arranged in a series of rows disposed in transverse relation to the longitudinal axis of the body member 32, with the major axes of the individual rectangular apertures 36 being also disposed in transverse relation to the longitudinal axis of the body member. The rows of apertures 36 are offset relative to each other such that the apertures of one row are located generaly between the apertures in the next adjacent row, as when considered from left to right in FIG. 1. The number of apertures 36 constituting each row, and the length and width of the body member 32 may be varied as desired in accordance with the size of a work piece to be reduced by removal of material therefrom.

The sheet metal file 30 includes a plurality of cutting teeth 38 which serve to reduce a surface of the work piece in a manner as described below, with one such tooth being provided adjacent each aperture 36. The teeth 38 are preferably all identical in shape and are struck from the planar body member 32 so as to depend downwardly therefrom in generally inclined relation with the plane of the body member. The upper portions of the teeth 38 are integrally connected to the body member and define peripheral portions of their corresponding apertures 36. Noting FIG. 2, each tooth 38 has an upper surface 40 and a lower surface 42 with the lower end of the tooth being defined by a frontal end surface 44. The angular relation between the plane of the frontal end surface 44 and the plane of the body 32 determines the rake angle of each tooth 38. The line of intersection of the plane of frontal face 44 with the plane of the bottom surface 42 of each tooth 38 defines a cutting edge 46. The teeth 38 illustrated in FIGS. 1–4 are termed zero rake teeth; that is, the plane of frontal end surface 44 is normal to the plane of the body member 32.

Referring to FIGS. 3 and 4, a punch and die arrangement is illustrated in conjunction with the formation of a single aperture 36 and cutting tooth 38 in the sheet metal file 30. It will be understood that the portions of the punch and die arrangement described with respect to the formation of a single aperture 36 and cutting tooth 38 may be readily expanded so as to effect the formation of a plurality of apertures and teeth simultaneously over the surface of the body member 32. A punch member 48, having a rectangular cross section substantially identical to the desired cross sectional configuration of the aperture 36 to be formed, is suitably supported for movement in a direction to cooperate with a die member 50. The die 50 has a recess or aperture 52 therein to receive the punch 48. The recess 52 has a rectangular cross sectional area slightly larger than the rectangularly shaped punch 48 to provide clearance between the punch and die during operation as is conventional in stamping and shearing operations. The die member 50 has an upper planar surface 56 which lies in a plane normal to the longitudinal axis of aperture 52. The die 50 also has a recess pocket adjacent the aperture 52 defined by a planar surface 54. The planar surface 54 intersects the upper surface 56 of the die and is angularly inclined relative to both the upper surface 56 and the longitudinal axis of aperture 52.

The rectangular cross section of punch 48 is defined by parallel side walls 58, 60 and parallel end walls 62, 64. The punch 48 also has a bottom surface 66 which lies in a plane normal to the walls 58, 60, 62 and 64. The lines of intersection between the plane of the bottom surface 66 and the planes of the respective walls 58, 60, 62 and 64 define shearing edges on the punch.

In forming the sheet metal file illustrated in FIG. 1, the apertures 36 and cutting teeth 38, including the cutting edges 46, are formed through a continuous movement or stroke of the punch 48 into the aperture or recess 52 of die member 50. The flat sheet metal blank from which sheet metal file 30 is to be made is placed in position on the upper surface 56 of the die 50 and retained thereon in a suitable manner. The punch 48 is then brought into contacting engagement with the body member 32 upon the die 50 such that the lower surface 66 of the punch engages the upper surface of the body member 32 in overlying relation to the aperture 52 in the die. Downward movement of punch member 48 may be accomplished in a conventional manner through means applying an axial force to the punch sufficient to effect shearing of the sheet metal body 32 along shearing edges defined by the intersection of the bottom surface 66 of punch 48 with side surfaces 58 and end surfaces 62, 64 thereof. The shearing of body 32 along the above-noted shearing edges of punch 48 is effected through cooperation of the punch shearing edges with corresponding edges on the die 50 defined by the intersection of the walls of rectangular aperture 52 with the upper surface 56 of the die. As the punch 48 is moved downwardly, the portion of the sheet metal body 32 overlying the inclined surface 54 of die 50 is bent downwardly. The portions of body 32 overlying die surface 54 and lying in the planes of end surfaces 62 and 64 of punch 48 are torn along two surfaces 68 adjacent the inclined surface 54 of the die to thereby define the edges of each tooth 38. Each cutting tooth 38 is formed or bent downwardly over an edge portion 70 of die 50 defined by the intersection of the planes of inclined surface 54 and upper surface 56 of the die. Continued downward movement of punch 48 forms the tooth 38 against the inclined surface 54 whereupon the shearing edge of punch 48 defined by the intersection of side surface 60 and bottom surface 66 cooperates with a shearing edge 72 on the die member to shear the downwardly inclined cutting tooth 38 along the frontal end surface 44, thereby creating a rectangular blank or slug 74 which is suitably ejected from the die member 53.

It will be understood that with the above described punch 48 and die 50 arrangement having the upper surface 56 of the die disposed in normal relation to the surfaces defining the rectangular aperture 52 in the die, the frontal end surface 44 of tooth 38 created through the above-described shearing action will have a zero rake angle, and a clearance angle equal to the included angle between the inclined surface 54 on die member 50 and the upper surface 56 thereof.

The above-described sheet metal file 30 produced by a single continuous downward stroke of the punch 48 into the die 50 has been found to be particularly suitable for use on hardened automotive body filler plastic and is extremely economical to manufacture. The material removed from the work piece is forced through the apertures 36 for ready disposal.

Referring now to FIGS. 5 and 6, an alternative embodiment of a sheet metal file is illustrated showing a portion of a generally planar sheet metal body 80 which is somewhat similar to the body member 32 of the sheet metal file 30 illustrated in FIG. 1. The body member 80 has a plurality of generally rectangular shaped apertures 82 therein, when considered in plan view, which apertures 82 have portions of the peripheries thereof defined by depending cutting teeth 84 in similar fashion to the apertures 36 and cutting teeth 38 of the sheet metal file 30 of FIGS. 1–4. The sheet metal file illustrated in FIGS. 5 and 6 differs from that described above with respect to FIGS. 1–4 in providing positive rake angles alpha for the cutting teeth 84 as described more fully below.

Referring to FIG. 6, which is generally similar to FIG. 4, a punch, shown generally at reference numeral 86, and die, shown generally at reference numeral 88, are shown in operative relation with a portion of sheet metal body 80 after having formed an aperture 82 and cutting tooth 84. The punch 86 and die 88 are generally similar to punch 48 and die 50, respectively, of FIG. 4. The die 88 differs from die 50 in that it has an upper surface 90 thereon which is inclined relative to the longitudinal axis of the rectangular aperture 52 therein. The die 88 also includes a planar surface 92 which is angularly inclined relative to the plane of upper surface 90 such that the included angle between the plane of surface 92 and the plane of surface 90 is equal to the desired clearance angle for the cutting tooth 84. In similar fashion to the cutting tooth 38 of FIG. 2, the cutting teeth 84 has parallel upper and lower surface portions 94 and 96, respectively.

The punch 86 includes parallel side surfaces 58, 60 and a lower end surface 66 normal to the planes of side surfaces 58 and 60. The generally rectangular aperture 52 in die 88 is disposed in normal relation to a bottom surface 98 thereof which serves as a reference base for the die. When the punch is moved downwardly in normal relation to the base surface 98 of die 88 to be received within the rectangular aperture 52, it will engage the upper surface of the sheet metal body 80 and proceed to bend the portion of the sheet metal body overlying the inclined surface 92 downwardly, tearing such portion along edge surfaces 100. Continued downward movement of punch 86 will effect shearing along shear surfaces 102, form the cutting tooth portion 84 against the inclined surface 92, and shear a blank 104 from the sheet metal body 80 to thereby form a planar frontal end surface 106 on the downwardly depending end of the tooth. The planes of lower surface 96 and frontal end surface 106 of tooth 84 intersect to define a cutting edge 108.

Noting FIG. 5, the plane of the frontal end surface 106 of each cutting tooth 84 forms an included angle alpha with a vertical plane containing the cutting edge 108, which angle establishes the rake angle for the cutting tooth. Noting FIG. 6, the rake angle is determined by the angular relationship between the upper surface 90 of die 88 and the longitudinal axis of aperture 52. The positive rake angle alpha established on the cutting teeth 84 as above described is therefore the result of a single downward movement of the punch 86 in operative association with the die member 88. It will be appreciated that while the punch 86 and die 88 are illustrated in association with a single aperture 82 and cutting tooth 84, they will generally comprise a portion of a multiple punch and die assembly to effect simultaneous formation of a plurality of apertures and cutting teeth in the sheet metal body member 80. The positive rake on the frontal face 106 of each tooth 84 has been found particularly useful for removing material from a plastic work piece which has not fully hardened such as conventional body filler used in automobile repair work. In the semi-rigid state, the plastic material removed is readily sheared without tearing it away from the base metal.

FIGS. 7 and 8 show still another embodiment of a sheet metal file, which embodiment is generally similar to that above-described with respect to FIGS. 5 and 6. A portion of the sheet metal body member 80 is illustrated in FIG. 7 having a plurality of depending cutting teeth 110 in similar fashion to the cutting teeth 84 shown in FIG. 5. The sheet metal file of FIG. 7 also includes a plurality of generally rectangularly shaped apertures 82 through which shavings and material removed from the work piece pass during operation. The cutting teeth 110 differ from the cutting teeth 84 of FIG. 5 in that each tooth 110 has a small angled flat surface area 112 formed on the lower surface thereof to provide a small clearance relief angle beta adjacent the cutting edge 114 of each tooth.

Noting FIG. 8, the inclined planar surface area 112 is formed by a die member 115 which is similar to the die member 88 of FIG. 6 except that instead of having a single inclined surface area 92 thereon as does die 88, the die 115 has a pair of inclined planar surface portions 116 and 118. The planar surface area 116 is angularly disposed relative to the upper inclined surface 90 of die member 115, while the planar surface area 118 immediately adjacent the rectangularly shaped aperture 52 is inclined to the upper surface 90 at a substantially smaller angle beta.

In forming the cutting teeth 110 having clearance or relief surfaces 112 and cutting edges 114, the punch 86, which is identical to punch 86 of FIG. 6, is brought downwardly into cooperative relation with the rectangularly shaped aperture 52 in die 115. As punch 86 contacts the upper surface of sheet metal body 80, it will shear the body along the edges of the die defining the opening of rectangular aperture 52. The shearing pressure forces the tooth portion 110 against the inclined surfaces 116 and 118, with continued downward movement shearing the tooth along the frontal face 106 and establishing the rake angle alpha. The clearance or relief angle beta and rake angle alpha on each cutting tooth 110 are thus formed from a single downward movement of the punch 86 into cooperative relation with the die 115.

FIGS. 9–11 illustrate another embodiment of a sheet metal file in accordance with the present invention, with FIG. 9 showing the cutting tooth profile formed through the punch and die means of FIGS. 10 and 11. The sheet metal file portion illustrated in FIG. 9 includes a generally flat sheet metal body 120 which may take any preferred plan configuration such as the rectangular plan shape of the sheet metal file 30 shown in FIG. 1. The flat sheet metal body 120 has a plurality of apertures 122 provided therein, which apertures may be of generally rectangular plan configuration as are the apertures 36 in the body member 32 of FIG. 1. A plurality of depending cutting teeth 124 are struck from the sheet metal body 120 in a manner to be described below, such that cutting edges 126 are established thereon which lie in a plane disposed below the plane of the body member 120. The depending teeth 124 are defined by upper and lower surfaces 128 and 130, respectively, with each tooth having a frontal end surface 132 which comprises a rake surface for the cutting edge 126. The upper and lower surfaces 128 and 130 of each tooth 124 are formed in generally parallel relation such that the thickness of the tooth is uniform throughout its length to maximize the strength of the tooth.

FIG. 11 illustrates a punch, shown generally at 134, and a die, shown generally at 136, in exploded perspective view with a portion of the sheet metal body 120 disposed between them. The punch 134 is generally rectangular in cross-section and includes a projection 142 thereon disposed axially above the bottom surface 140 and a lower rectangularly shaped portion 138 of the punch. Projection 142 is disposed outwardly from a side surface 144 of the lower rectangular portion 138 of the punch and includes a generally radical surface portion 146 which serves to establish the side profile of a cutting tooth 124 during operation as will become more apparent below.

The die member 136 includes an aperture 152 having a generally rectangularly shaped cross-section with the side surfaces defining the aperture being disposed in normal relation to the plane of an upper surface 148 of the die. The cross-section of the lower portion of aperture 152 is substantially equal to the cross section of the lower rectangular portion 138 of punch 134 so as to receive the punch therein with a conventional amount of clearance therebetween. The aperture 152 includes a recess or pocket portion adjacent the upper surface 148 of the die, which pocket is defined by a generally vertical 154 and an inclined surface 156. The surfaces 154 and 156 are normal to the planes of the adjacent side surfaces defining aperture 152, with the recess defined thereby serving to receive the projection portion 142 of punch 134 during the formation of a tooth 124.

Referring to FIG. 10, the punch 134 and die 136 are shown in operative relation with a portion of the sheet metal body 120 disposed on the upper surface 148 of the die member. During formation of an aperture 122 and a cutting tooth 124 in the body 120, the punch 134 is brought downwardly toward the die 136 in a suitable manner such that the lower surface 140 of the punch engages the upper surface of the sheet metal body 120. Continued downward movement of the punch 134 shears the body 120 around the aperture 152 at the top surface 148 of die 136 at the left side (as viewed in FIG. 10), that is, opposite the portion of the body overlying the pocket or recess defined by surfaces 154 and 156 in die 136 in similar fashion to the initial shearing above described with respect to FIGS. 3 and 4. As the punch 134 is moved further downwardly within the aperture 152 of die 136, the radial surface 146 on the projection 142 engages the upper surface of the body portion overlying the angled recess in die 136 and bends it downwardly as shown in solid lines in FIG. 10. When the portion of the sheet metal body which forms the tooth 124 is bent downwardly until the lower portion thereof bottoms against the inclined surface 156 adjacent the rectangular aperture 152 in die 136, the punch 134 will effect shearing to establish the frontal end surface 132 and cutting edge 126 on the tooth. Continued downward movement of punch 134 to the position shown in dash lines in FIG. 10 forms the tooth 124 against the surfaces 154 and 156 defining the pocket in die 136 and causes the plane of the frontal end surface 132 to recede from the adjacent surface of punch 134 so as to form a slight concave curved surface having a positive rake angle alpha.

The clearance angle beta of each cutting tooth 124 is established by the angular relationship between the inclined surface 156 in die 136 and the upper surface 148 thereof. The radial surface portion 146 of the projection 142 of punch 134 is made sufficient to form the tooth 124 against the surfaces 154 and 156 defining the recess or pocket in die 136 and maintain the upper and lower surface portions 128 and 130, respectively, of the tooth in parallel relation, thus maintaining a uniform cross-sectional thickness throughout the length of each tooth 124. A single downward continuous stroke of the punch 134 will thus create the aperture 122, the cutting tooth 124, and the cutting edge 126 and frontal rake surface 132 on the tooth, as well as establishing a uniform thickness throughout the profile of the tooth and establishing a clearance angle thereon.

As was above described with respect to the punch 48 and die 50 of FIGS. 3 and 4, the punch 134 and die 136 illustrated in FIGS. 10 and 11 may comprise a portion of a punch and die set which simultaneously forms a plurality of apertures 122 in the sheet metal body member 120 and a plurality of depending cutting teeth 124.

While the above-described embodiments of sheet metal files in accordance with the present invention are illustrated as having generally rectangularly shaped apertures, when considered in plan view, the subject invention is not to be limited thereto. For example, the subject invention contemplates sheet metal files having generally circular apertures therein such as illustrated in FIG. 12. The sheet metal file of FIG. 12, indicated generally at reference numeral 160, comprises a flat sheet metal body 162 having a generally rectangular plan configuration similar to the sheet metal body 32 of FIG. 1. As was described with respect to the sheet metal file 30 of FIG. 1, the body 162 includes suitable means, such as apertures 164, for securing the sheet metal file 160 to a suitable carrier or handle means for ready manipulation of the file. The body 162 includes a plurality of generally circular apertures 166 arranged in offset rows in similar fashion to the offset rows of apertures 36 shown in FIG. 1.

FIG. 13 illustrates a portion of the body member 162 in operative association with a punch 168 and die 170, the punch being shown after having formed an aperture 166 in the body member 162. The punch 168 is a cylindrical member having a bottom surface 172 disposed normal to the longitudinal axis of the punch and defining a circular shearing edge with the peripheral surface of the punch at the line of intersection therewith. The diameter of the cylindrical punch 168 is substantially equal to the diameter of the circular apertures 166 desired in body member 162 of sheet metal file 160. The die 170, shown in top plan view in FIG. 15, includes an upper support surface 174 and a cylindrical aperture 176 having its longitudinal axis normal to the plane of upper surface 174. Aperture 176 has a diameter slightly larger than the diameter of the cylindrical punch 168 to readily receive the punch therein. The upper surface 174 of die 170 is provided with an inclined surface 178 which extends symmetrically approximately 180° about the center axis of aperture 176 as when viewed in FIG. 15. The end portions 179 of the inclined surface 178 are generally radial and blend the inclined surface into the peripheral wall portion of aperture 176 at diametrically opposite points on the peripheral wall surface. The aperture 176 has a lower enlarged cylindrical portion 181 which allows a circular blank sheared from the body 162 to be readily removed from the lower end of the die.

In the formation of an aperture 166, a cutting tooth 180 is formed about approximately 180° of the periphery of each aperture 166. Each tooth is formed against an inclined surface 178 of die member 170 so as to be inclined downwardly relative to the plane of body 162. Each aperture 166 thus has a portion of its periphery defined by a cutting tooth 180. Noting FIG. 13, in forming apertures 166 and cutting teeth 180, the sheet metal body 162 is placed on the upper support surface 174 of the die 170. The punch 168 is brought downwardly in overlying relation to the aperture 176 in die 170 through a suitable means and engages the upper surface of the sheet metal body 162. Further downward movement of punch 168 effects a shearing of the sheet metal body 162 about approximately 180° of the cylindrical punch 168, such shearing being opposite the inclined surface 178 of die 170. Continued downward movement of punch 168 causes the portion of body 162 overlying the inclined surface 178 to be formed against the inclined surface, with further downward movement serving to complete the shearing of a generally circular blank from the body 162. As the blank is sheared, a frontal face 182 and a cutting edge 184 are formed on the lower end of the downwardly inclined cutting tooth 180. FIG. 14 illustrates the formed cutting tooth 180 with its cutting edge 184 and frontal surface portion 182. It will be noted that as the tooth 180 is struck from the body 162, the full cutting edge 184 of the tooth will not lie in a plane parallel to the plane of the body 162. As shown in FIG. 14, the cutting edge 184 will have a generally upwardly extending radial portion on either end thereof when viewed in a direction opposite a cutting stroke. The relative spacing between adjacent apertures in the respective rows of apertures in the body 162 is thus preferably selected such that continuous plane of cutting edges 184 is presented to the surface of a work piece being reduced. The rake angle of each depending tooth 180 is zero when each of the cutting teeth is formed in a manner described with respect to FIGS. 13–15.

Referring now to FIGS. 16–19, an alternative embodiment of a sheet metal file having generally circular apertures is shown. Noting FIG. 16, a portion of a flat sheet metal body 190 is illustrated as supported on an upper surface 192 of a die 194 with a punch member 196 in operative relation with the die to form an aperture and cutting tooth in and from the sheet metal body. The die member 194 is generally similar to die 170 of FIG. 13 but includes a pocket defined by a surface 198 normal to the upper surface 192 of the die and an arcuate surface 200 angularly inclined relative to the upper surface 192, both surfaces 198 and 200 extending approximately 180° symmetrically about the center of a cylindrical aperture 176 in the die 194.

The punch member 196, shown in side detail in FIG. 18, includes a cylindrical end portion 202 and a projection or shoulder portion 204. The lower portion of shoulder 204 adjacent end 202 extends approximately 180° around the peripheral surface of the cylindrical portion 202 so as to define radial surfaces 206 between the outer peripheral surface of projection 204 and the cylindrical peripheral surface of portion 202.

Noting FIGS. 16 and 17, it can be seen that when the punch 196 is brought downwardly into engagement with the upper surface of the sheet metal body 190 against the upper surface 192 of die 194, the bottom cylindrical portion 202 of the punch 196 will, upon further downward movement thereof, shear a portion of the sheet metal body 190 opposite the pocket defined by surfaces 198 and 200 to form a peripheral portion 208 of an aperture 210 in the body. The portion of body 190 overlying the inclined surface 200 of die 194 is bent or formed downwardly by engagement with the projection or shoulder 204 of punch 196 until the bottom surface of the overlying portion engages the inclined surface 200. When such overlying portion so engages the inclined surface 200, as shown in solid lines in FIG. 16, the lower cylindrical portion 202 of the punch 196 will shear a generally circular blank from body 190 and thereby create a cutting tooth 212 having a frontal face 214 and a cutting edge 216 on the lower depending end thereof. When the projecting portion 204 of punch 196 engages the intermediate part of the tooth 212 and drives it to a position wherein the lower end thereof engages the inclined surface 200, the profile of the cutting tooth will be as shown in dash lines in FIG. 16. Continued downward movement of the punch 196 and its projection 204 partially forms the tooth 212 against surfaces 198 and 200 to form a tooth having a profile as shown in solid lines in FIG. 16. In the latter profile, the frontal face 214 has a generally concave curved surface defining a positive rake for the cutting edge 216.

As was above described with respect to the cutting tooth 124 of the sheet metal body 120 of FIG. 10, the cutting tooth 212 of FIG. 16 has parallel upper and lower surfaces which define a uniform thickness for the tooth as shown in profile in FIG. 16. The inclined surface 200 in the die 194 forms a clearance angle on the bottom surface of the cutting tooth adjacent the cutting edge as the tooth is formed against surface 200 by the projection 204 on punch 196. It can thus be seen that the cutting tooth 212 of the sheet metal file illustrated in FIGS. 16 and 17 is formed through a continuous downward movement of the punch member 196 which, during its downward stroke, forms an aperture, the cutting tooth 212, the frontal rake surface 214, the cutting edge 216, and a clearance angle which is defined as the bottom surface of the tooth is formed against the inclined surface 200 of the die 194. As was above described with respect to the punch 134 and die 136 of FIG. 10, the punch 196 and the die 194 of FIG. 16 may form a portion of a composite punch and die arrangement for simultaneously forming a plurality of selectively spaced apertures 206 and cutting teeth 212 from the sheet metal body member 190.

Preferably, the sheet metal files above described and illustrated in FIGS. 1–19 are made from low carbon steel and subsequently case hardened, which hardening takes place over the entire flat sheet metal body and the depending cutting teeth.

It will be understood that while the above described embodiments of sheet metal files have been described as having generally rectagular and circular apertures therein, other plan aperture configurations such as square shaped, semicircular shaped, V-shaped, triangular shaped, and oblong shaped apertures may be readily formed in the manner above described while maintaining the basic concepts of the subject invention.

While preferred embodiments of my invention have been shown and described, it will be understood that changes and modifications may be made therein without departing from the invention in its broader aspects, and therefore, the appended claims are intended to cover all such changes and modifications as fall within the true spirit and scope of my invention.

I claim:

1. A method of making a workpiece reducing tool having a sheet metal body, comprising the steps of punching a plurality of apertures in the body, in the same punching movement striking a cutting tooth from the body adjacent each aperture such that each tooth is inclined downwardly and includes a lower end portion disposed at least partially below the plane of the body and an upper portion integrally conected to the body, the lower end portion having upper and lower surfaces disposed in generally parallel relation such that each tooth has a generally uniform thickness when considered in profile, said punching movement establishing a cutting edge and a frontal end surface on the lower inclined end of each tooth substantially simultaneously with the striking of each cutting tooth, and causing a positive rake angle to be formed on the frontal end surface of each tooth substantially simultaneously with the striking of the teeth.

2. A method of making a work piece reducing tool having a sheet metal body, comprising the steps of punching a plurality of apertures in the body, in the same punching movement striking a cutting tooth from the body adjacent each aperture such that each tooth is inclined downwardly and includes a lower end portion disposed at least partially below the plane of the body and an upper portion integrally connected to the body, the lower end portion having upper and lower surfaces disposed in generally parallel relation such that each tooth has a generally uniform thickness when considered in profile, said punching movement establishing a cutting edge and a frontal end surface on the lower inclined end of each tooth substantially simultaneously with the striking of each tooth, and then substantially simultaneously with the striking of each tooth tilting the frontal end surface thereof in a manner to provide a positive rake angle.

3. The method of claim 1 including the step of establishing a clearance angle for each tooth simultaneously with establishing the cutting edge and frontal end surface thereon.

4. The method defined in claim 1 wherein said punching step includes moving a punch member into operative relation with a die having the flat sheet metal body disposed thereon, the die having an aperture therein to receive the punch in operative relation therewith.

5. The method defined in claim 4 wherein an intermediate portion of each cutting tooth is formed through engagement thereof with the punch and die assembly, the die having a recess therein, adjacent said aperture, defined by an inclined surface against which the intermediate portion of the tooth is formed.

6. A method of making a workpiece reducing tool having a sheet metal body, comprising the steps of punching a plurality of apertures in the body, in the same punching movement striking a cutting tooth from the body adjacent each aperture such that each tooth is inclined downwardly and includes a lower end portion disposed at least partially below the plane of the body and an upper portion integrally connected to the body, establishing a cutting edge and a frontal end surface on the lower inclined end of each tooth substantially simultaneously with the striking of each cutting tooth and forming an intermediate portion of each cutting tooth to establish primary and secondary clearance angles thereon substantially simultaneously with establishing the cutting edge and frontal end surface of each tooth.

7. The method defined in claim 6 including the step of tilting the frontal end surface of each tooth to provide a positive rake angle therefor simultaneously with forming the primary and secondary clearance angles thereon.

8. The method defined in claim 6 wherein said primary and secondary clearance angles are formed on each cutting tooth through engagement thereof with inclined surfaces defining a recess in a die, said engagement being effected by operative association of the die with a punch member.

References Cited

UNITED STATES PATENTS

| | | | |
|---|---|---|---|
| 1,373,882 | 4/1921 | Glassco | 76—101 |
| 2,110,799 | 3/1938 | Henschell | 76—101 |
| 2,708,376 | 5/1955 | Booth | 76—24 |
| 2,976,747 | 3/1961 | Shatzschock | 76—101 |
| 2,984,892 | 5/1961 | Oxford et al. | 29—78 |
| 3,174,363 | 3/1965 | Staiger | 76—24 |
| 3,411,194 | 11/1968 | Don | 29—78 |

FOREIGN PATENTS

| | | |
|---|---|---|
| 571,355 | 10/1958 | Belgium. |
| 3,308 | 2/1883 | Great Britain. |
| 960,905 | 11/1949 | France. |

HARRISON L. HINSON, Primary Examiner

U.S. Cl. X.R.

29—78; 76—101